United States Patent
Funari et al.

(10) Patent No.: US 10,487,486 B2
(45) Date of Patent: Nov. 26, 2019

(54) FLUSH VALVE WITH RELIEF VALVE HAVING AXIALLY-TRANSLATABLE VALVE ELEMENT

(71) Applicant: Zurn Industries, LLC, Milwaukee, WI (US)

(72) Inventors: Michael A. Funari, Apex, NC (US); Roy F. Leviner, III, Aberdeen, NC (US); Marc G. Block, Apex, NC (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 6 days.

(21) Appl. No.: 15/890,673

(22) Filed: Feb. 7, 2018

(65) Prior Publication Data
US 2018/0223512 A1    Aug. 9, 2018

Related U.S. Application Data (60) Provisional application No. 62/456,237, filed on Feb. 8, 2017.

(51) Int. Cl.
| E03D 1/35 | (2006.01) |
| E03D 3/06 | (2006.01) |
| E03D 1/36 | (2006.01) |

(52) U.S. Cl.
CPC .............. *E03D 1/35* (2013.01); *E03D 1/36* (2013.01); *E03D 3/06* (2013.01)

(58) Field of Classification Search
None
See application file for complete search history.

(56) References Cited

U.S. PATENT DOCUMENTS

| 1,614,468 A | * | 1/1927 | Haas | .......................... E03D 3/06 251/18 |
| 4,505,450 A | * | 3/1985 | Saarem | .................. F16K 31/402 137/244 |
| 4,793,588 A | * | 12/1988 | Laverty, Jr. | ............... E03D 3/06 251/30.03 |
| 4,821,765 A |   | 4/1989 | Iqbal et al. | |
| 4,911,401 A | * | 3/1990 | Holcomb | ............... F16K 31/402 137/315.03 |
| 4,995,585 A | * | 2/1991 | Gruber | .................... E03C 1/057 251/129.04 |
| 5,042,775 A | * | 8/1991 | Willemsen | ............ F16K 31/402 222/14 |
| 5,079,495 A |   | 1/1992 | Yasuo | |

(Continued)

*Primary Examiner* — Marina A Tietjen
*Assistant Examiner* — Daphne M Barry
(74) *Attorney, Agent, or Firm* — Michael Best & Friedrich LLP (57) ABSTRACT

A flush valve has a relief valve including a stationary relief valve housing and an axially-translatable valve element. The axially-translatable valve element has an axial end that can be selectively translated to unseal an upper opening in a relief passageway through the stationary relief valve housing in order to permit fluid flow therethrough in order to initiate a flush cycle by the lifting of a diaphragm assembly. The axially-translatable valve element may include lead screw-like features which can be used to axially drive the axially-translatable valve element relative to the stationary relief valve housing to open or close the relief valve.

12 Claims, 7 Drawing Sheets

(56) References Cited

U.S. PATENT DOCUMENTS

| | | | |
|---|---|---|---|
| 5,169,117 A * | 12/1992 | Huang | F16K 31/086 |
| | | | 251/30.01 |
| 5,187,816 A * | 2/1993 | Chiou | E03D 5/105 |
| | | | 4/304 |
| 5,244,179 A * | 9/1993 | Wilson | E03D 5/10 |
| | | | 251/285 |
| 5,469,586 A | 11/1995 | Tsutsui et al. | |
| 5,497,135 A * | 3/1996 | Wisskirchen | H01F 7/1615 |
| | | | 335/229 |
| 5,918,626 A | 7/1999 | Strong et al. | |
| 6,082,703 A | 7/2000 | Fava et al. | |
| 6,341,731 B1 | 1/2002 | Knapp | |
| 6,643,853 B2 | 11/2003 | Wilson et al. | |
| 6,840,496 B2 | 1/2005 | Maercovich et al. | |
| 6,845,961 B2 | 1/2005 | Maercovich et al. | |
| 6,860,282 B2 | 3/2005 | Guler | |
| 6,923,424 B2 | 8/2005 | Maercovich et al. | |
| 6,974,118 B2 | 12/2005 | Maercovich et al. | |
| 6,978,490 B2 | 12/2005 | Wilson | |
| 7,028,977 B2 | 4/2006 | Maercovich et al. | |
| 7,063,103 B2 | 6/2006 | Guler et al. | |
| 7,232,110 B2 | 6/2007 | Maercovich et al. | |
| 7,407,147 B2 | 8/2008 | Maercovich et al. | |
| 7,510,166 B2 | 3/2009 | Maercovich et al. | |
| 7,549,436 B2 | 6/2009 | Parsons et al. | |
| 7,552,905 B2 | 6/2009 | Maercovich et al. | |
| 7,589,445 B2 * | 9/2009 | Gandel | H02K 7/06 |
| | | | 310/20 |
| 7,681,860 B2 | 3/2010 | Maercovich | |
| 7,857,280 B2 | 12/2010 | Maercovich et al. | |
| 7,862,001 B2 | 1/2011 | Maercovich et al. | |
| 8,016,262 B2 | 9/2011 | Maercovich | |
| 8,087,636 B2 | 1/2012 | Maercovich et al. | |
| 8,091,856 B2 | 1/2012 | Maercovich et al. | |
| 8,152,135 B2 | 4/2012 | Maercovich | |
| 8,292,258 B2 | 10/2012 | Maercovich et al. | |
| 8,317,155 B2 | 11/2012 | Maercovich | |
| 8,322,682 B2 | 12/2012 | Maercovich | |
| 8,464,998 B2 | 6/2013 | Maercovich | |
| 8,596,606 B2 | 12/2013 | Maercovich | |
| 8,596,607 B2 | 12/2013 | Maercovich | |
| 8,714,516 B2 | 5/2014 | Maercovich et al. | |
| 8,739,829 B2 | 6/2014 | Maercovich et al. | |
| 9,003,574 B2 | 4/2015 | Maercovich | |
| 9,057,452 B2 | 6/2015 | Maercovich | |
| 9,115,487 B2 | 8/2015 | Maercovich | |
| 9,574,336 B1 | 2/2017 | Maercovich | |
| 9,657,471 B2 | 5/2017 | Denzin et al. | |
| 9,719,238 B2 | 8/2017 | Momoe et al. | |
| 2003/0088338 A1 | 5/2003 | Phillips et al. | |
| 2004/0193326 A1 | 9/2004 | Phillips et al. | |
| 2007/0068583 A1 | 3/2007 | Johnson et al. | |
| 2007/0151008 A1 | 7/2007 | Hayashi et al. | |
| 2013/0152292 A1 * | 6/2013 | Yu | E03D 1/36 |
| | | | 4/378 |
| 2014/0224338 A1 | 8/2014 | Maercovich | |
| 2017/0241118 A1 | 8/2017 | Denzin et al. | |
| 2017/0298608 A1 | 10/2017 | Maercovich | |

* cited by examiner

FLUSH VALVE WITH RELIEF VALVE HAVING AXIALLY-TRANSLATABLE VALVE ELEMENT

CROSS-REFERENCE TO RELATED APPLICATIONS

This application claims the benefit of the filing date of U.S. Provisional Patent Application No. 62/456,237 entitled "Flush Valve With Relief Valve Having Axially-Translatable Valve Element" filed on Feb. 8, 2017, which is hereby incorporated by reference for all purposes as if set forth in its entirety herein.

STATEMENT OF FEDERALLY SPONSORED RESEARCH OR DEVELOPMENT

Not applicable.

FIELD OF INVENTION

This disclosure relates to a flush valve and the operation thereof, which allows the actuation of a flush cycle.

BACKGROUND

Manual flush valves for use in urinals, water closets, and toilets are well known in the art. Two common types of flush valves are diaphragm flush valves and piston flush valves. Diaphragm flush valves typically include a fluid inlet and a fluid outlet separated by a diaphragm that selectively prevents fluid from flowing from the fluid inlet to the fluid outlet. The diaphragm of a flush valve selectively prevents fluid from flowing from the fluid inlet to the fluid outlet by being disposed on a valve seat of the fluid outlet. The diaphragm of the flush valve includes a refill orifice that allows fluid flowing from the fluid inlet to flow into a top chamber above the diaphragm. Fluid in the top chamber above the diaphragm applies pressure to seat the diaphragm onto the valve seat of the fluid outlet. The diaphragm of the flush valve further includes a relief valve which selectively allows fluid to pass from the fluid inlet to the fluid outlet. The relief valve commonly features a valve stem that extends downward into the fluid outlet. The valve stem interfaces with a plunger connected to a manual lever arm. The manual lever arm is actuated by a user which pushes the plunger into contact with the valve stem. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the user releases the manual lever arm, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

Automated flush valves are also well known in the art. Automated flush valves commonly rely on sensors that detect the presence of a user in order to initiate a flush as opposed to a manual lever arm that requires actuation by a user. Automated flush valves have similar internal structures to manual flush valves. As noted with manual diaphragm flush valves, automated flush valves include a fluid inlet and a fluid outlet separated by a diaphragm that selectively prevents fluid from flowing from the fluid inlet to the fluid outlet. The diaphragm of the flush valve includes a refill orifice that allows fluid flowing from the fluid inlet to flow into a top chamber above the diaphragm. Fluid in the top chamber above the diaphragm applies pressure to seat the diaphragm onto the valve seat of the fluid outlet. The diaphragm of the flush valve selectively prevents fluid from flowing from the fluid inlet to the fluid outlet by being disposed on a valve seat of the fluid outlet. The diaphragm of a flush valve includes a relief valve which selectively allows fluid to pass from the fluid inlet to the fluid outlet. The relief valve commonly features a valve stem that extends downward into the fluid outlet. The valve stem interfaces with a plunger connected to an automated actuation mechanism. The automated actuation mechanism is configured to push the plunger into contact with the valve stem. The automated actuation mechanism most commonly utilizes a solenoid, while alternative embodiments can utilize a motor coupled to a gear train or other automated actuation mechanisms. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the automated actuation mechanism releases from contact with the plunger, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

The actuation of the valve stem by the plunger causes the valve stem to be at an angle with respect to the valve seat. The angle of the valve stem selectively opens the relief valve by tilting the relief valve at an angle relative to the valve seat. The selective opening of the relief valve is unpredictable due to variations in pressure applied to the diaphragm caused by fluid communicated into the upper chamber via the bypass opening in addition to the variation in the actuation by a user or an automated actuation mechanism. The unpredictability of the opening causes control and precision problems. The amount of fluid flowing through the opening is correlated to the size of the opening in the relief valve. The amount of fluid flowing through the flush valve is difficult to control due to the unpredictability of the opening in the relief valve. The timing of a flush cycle is also correlated to the size of the opening allowing water to pass through the relief valve. The unpredictability of the opening in the relief valve also makes the timing of a flush cycle difficult to control.

Additional disadvantages arise with commonly utilized solenoids for automated actuation of the plunger. First, solenoids and their components tend to corrode in the presence of hard water. Second, solenoids exhibit inconsistent performance at varying pressures that may cause the plunger to bounce in response to a high or a low pressure. Third, solenoids have an increased sensitivity to manufacturing tolerances (e.g. spring forces, magnetic force, etc.). Each of these disadvantages, alone or in combination with one another, may cause undesirable performance and maintenance issues.

It is therefore desirable for a flush valve to more precisely control the opening in the relief valve and improve durability of the components in the flush valve.

SUMMARY OF THE INVENTION

Proposed herein is an alternative design for a flush valve, and in some aspects an alternative design for flush valve internals (i.e. a relief mechanism). The proposed design may be a retrofit design to replace an existing flush valve. The proposed design may also be a stand-alone unit or employ any other installation methods. The proposed design features an alternative flush valve that can utilize an alternative relief valve that allows for precise control of the opening of the relief valve, increases durability of the components in the flush valve, and removes components from the fluid outlet flow path.

According to one aspect, the flush valve has a valve housing that defines a fluid passageway between a fluid inlet and a fluid outlet. The fluid passageway has a diaphragm valve seat disposed between the fluid inlet and the fluid outlet. The flush valve also has a diaphragm assembly that includes a diaphragm and a disc. The diaphragm has a primary opening and a bypass opening. The primary opening receives the disc therein and the bypass opening allows water under pressure supplied to the water inlet to pass from a fluid inlet side of the diaphragm into a chamber in the fluid passageway established by a presence of the diaphragm assembly in the fluid passageway. The diaphragm assembly is disposed in the fluid passageway and is movable between an opened position in which the disc of the diaphragm assembly is not in contact with the diaphragm valve seat and a closed position in which the disc of the diaphragm assembly is in contact with the diaphragm valve seat. The flush valve also includes a relief valve configured to selectively control fluid flow from the chamber to the fluid outlet. The relief valve comprises a stationary relief valve housing and an axially-translatable valve element. The stationary relief valve housing has a relief passageway and the axially-translatable valve element has an axial end positionable to selectively seal an upper opening in the relief passageway of the relief valve housing to regulate fluid flow therethrough. In the closed position of the diaphragm assembly and with the relief valve closed, the disc contacts the diaphragm valve seat to form a seal therebetween. When the flush valve is activated and the relief valve is opened by lifting the axial end of the axially-translatable valve element from the upper opening of the relief passageway, a flow of water from the chamber into the fluid outlet via the relief passageway occurs thereby relieving a fluid pressure in the chamber and causing the diaphragm assembly to move from the closed position to the opened position such that the disc is unseated from the diaphragm valve seat further permitting water to pass from the fluid inlet to the fluid outlet in a space between the disc and the diaphragm valve seat.

In some forms, the flush valve may further include a motor in which an axial position of the axially-translatable valve element relative to the stationary relief valve housing is controlled by the motor and a drive train that includes a lead screw part that is integral with the axially-translatable valve element. The lead screw part that is integral with the axially-translatable valve element may a male lead screw part, the drive train may include a female driving part positioned to selectively drive the male lead screw part, and the axially-translatable valve element may be restricted from angular rotation such that driving of the male lead screw part by the female driving part displaces the axially-translatable valve element axially, but not angularly. The female driving part may be rotationally driven and mesh with the male lead screw part to provide axial translation of the axially-translatable valve element.

In some forms, when the diaphragm assembly is in the open position and the relief valve is returned to the closed position, fluid pressure may build in the chamber thereby causing the disc to contact the diaphragm valve seat thereby reforming a seal therebetween, returning the diaphragm assembly to the closed position.

In some forms, the chamber in the fluid passageway may be established by a presence of the diaphragm assembly in the fluid passageway and a fixed member disposed within the valve housing. The fixed member may contact the diaphragm in at least one radial position and may have an extension that extends away from the diaphragm assembly. The extension of the fixed member may have an inner chamber. The inner chamber of the fixed member may support at least the stationary relief valve housing of the relief valve assembly. In some forms, the stationary relief valve housing may be threadably connected to the fixed member and the threads of the stationary relief valve housing may have at least one planar flat surface formed therein (or other shaped sections removed therefrom). These removed sections or flats of the threads may create fluid communication between a volume of an upper chamber between the fixed member and the diaphragm assembly and a volume between the stationary relief valve housing and the axial-translatable valve element.

In some forms, the presence of the fixed member may be used to help ensure accurate flush volume.

In some forms, the diaphragm valve seat may define a peripheral fluid passageway in which the peripheral fluid passageway is in fluid communication with the fluid inlet and the fluid outlet when the diaphragm assembly is in the open position thereby allowing additional fluid to flow from the fluid inlet to the fluid outlet.

In some forms, the open position of the relief valve may occur when the axial end of the axially-translatable valve element is translated out of contact with the stationary relief valve housing.

In some forms, the diaphragm may be flexible. The diaphragm may be configured to bend to allow the diaphragm assembly to move from the closed position to the open position.

In some forms, the disc may have a circular outer periphery.

In some forms, the relief valve assembly may be configured to be in an open position from 0.5 to 3 seconds which results in the flush valve being open from 3 to 10 seconds.

In some forms, the axial end of the axially-translatable valve element may have an elastomeric element on a tip thereof that seals the opening of the relief passageway of the stationary relief valve housing when the relief valve is in the closed position.

According to another aspect, a method for operating a flush valve is disclosed. A fluid under pressure is provided to a fluid passageway in a valve housing via a fluid inlet. The fluid is communicated through a bypass opening in a diaphragm assembly into a chamber in which the diaphragm assembly is disposed in the fluid passageway. The diaphragm assembly is also movable between an opened position in which the diaphragm assembly is not in contact with a diaphragm valve seat and a closed position in which the diaphragm assembly is in contact with the diaphragm valve seat, in which the chamber is established by a presence of the diaphragm assembly in the fluid passageway. The fluid in the chamber is communicated into a relief valve having a stationary relief valve housing and an axially-translatable valve element. The stationary relief valve housing has a relief passageway and the axially-translatable valve element has an axial end positionable to selectively seal an upper opening in the relief passageway of the stationary relief valve housing to regulate fluid flow therethrough. The axially-translatable valve element translates into an open position such that the upper opening in the relief valve housing is unsealed by the axial end of the axially-translatable valve element. The fluid is communicated through the relief valve to a fluid outlet. The diaphragm assembly translates from the closed position to the open position such that the diaphragm assembly is unseated from the diaphragm valve seat permitting water to pass from the fluid inlet to the fluid outlet in a space between the diaphragm assembly and the diaphragm valve seat.

In some forms, the axially-translatable valve element may include a male lead screw part and a drive train of the flush valve may include a female driving part. The step of translating the axially-translatable valve element may involve driving the female driving part such that the female driving part meshes with the male lead screw part to translate the axially-translatable valve element.

In some forms, during the step of translating the axially-translatable valve element, the axially-translatable valve element may be restricted from angular rotation such that driving of the male lead screw part by the female driving part displaces the axially-translatable valve element axially, but not angularly.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Embodiments of the disclosure may be further understood with reference to the figures.

Figure 1:
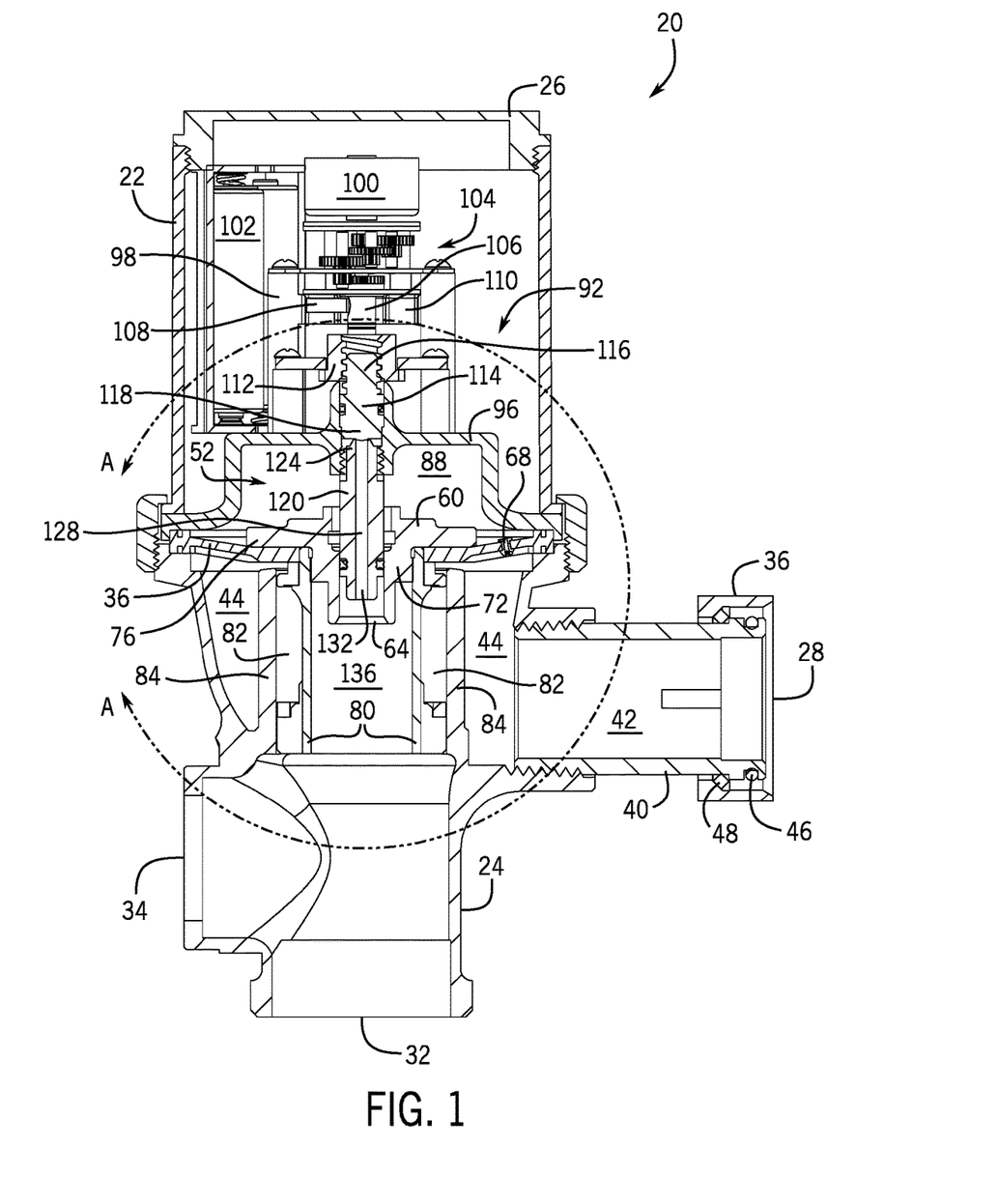
FIG. 1 is a sectional view of the flush valve.
Figure 2:
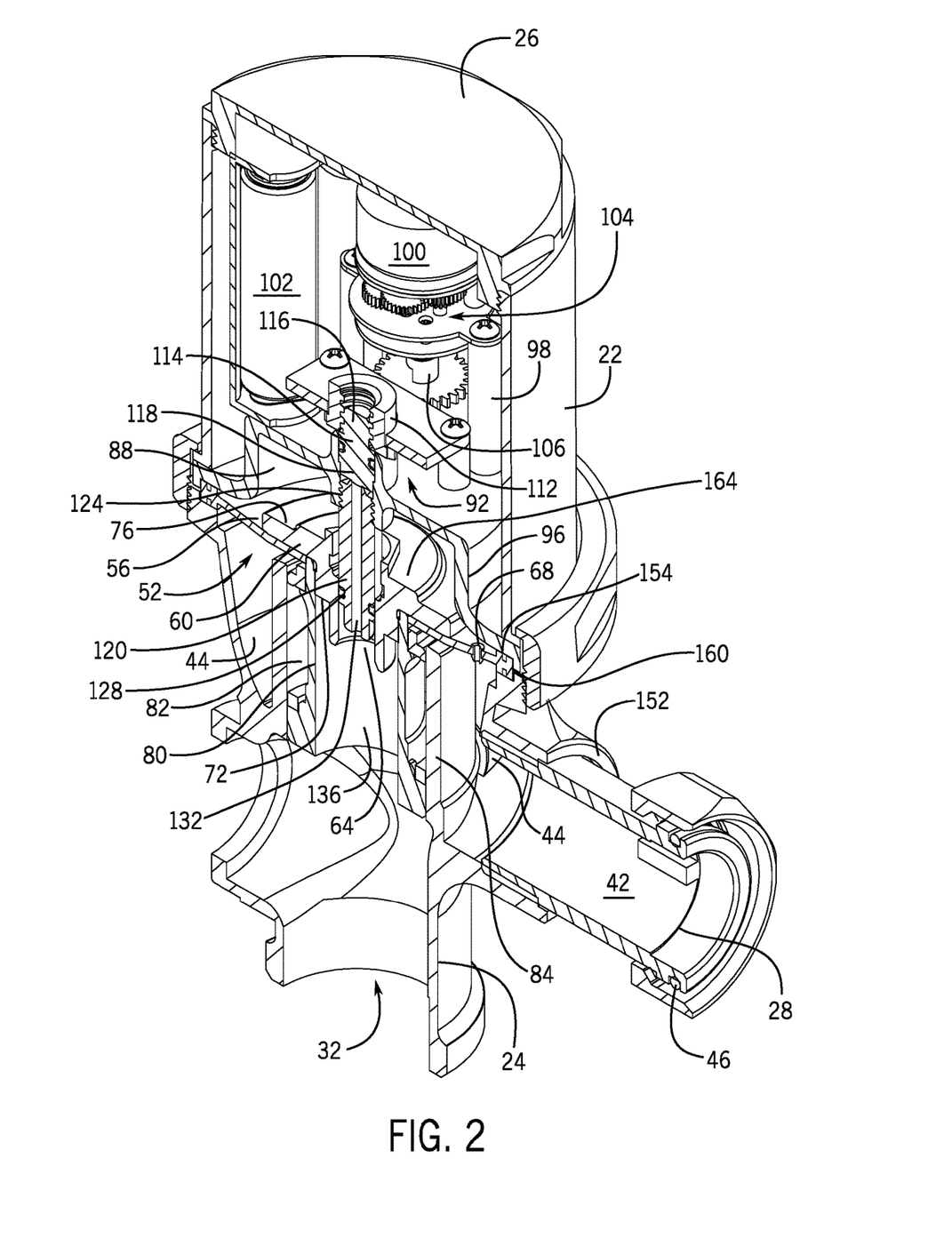
FIG. 2 is a perspective sectional view of the flush valve of FIG. 1.
Figure 3:
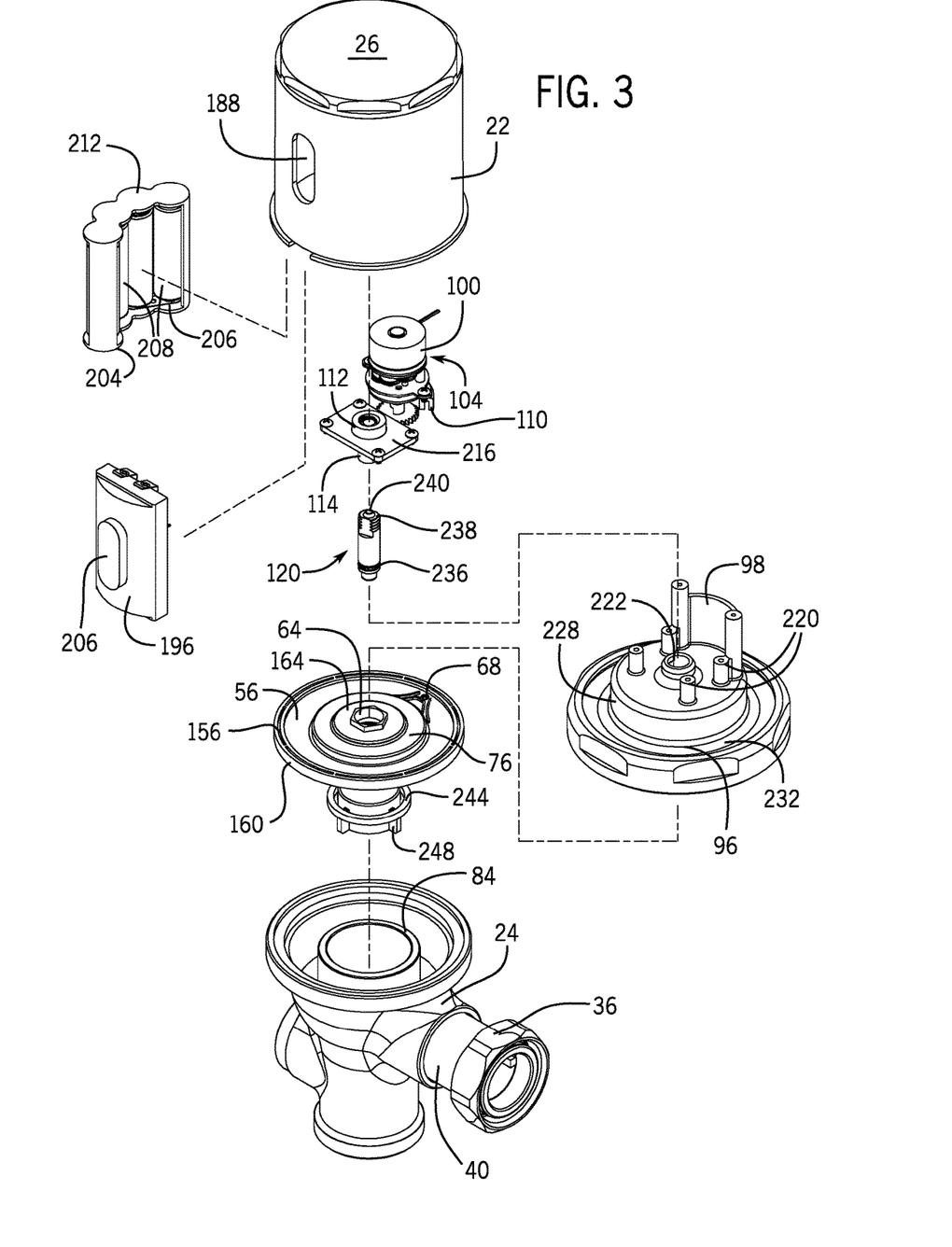
FIG. 3 is an exploded view of the flush valve.

FIGS. 1 through 3 illustrates one exemplary embodiment of a flush valve 20. The flush valve 20 has a housing that includes an upper housing body 22 and a lower housing body 24 (see FIG. 3) that may be connected such that the upper housing body 22 and lower housing body 24 enclose the flush valve 20. In a non-limiting example, the upper housing body 22 may be threaded into connection with the lower housing body 24, and the upper housing body 22 may have a cap 26 threaded into the top of the upper housing body 22. The lower housing body 24 may have an inlet 28, an outlet 32, and a cap 34 over an opening that would traditionally accommodate a mechanical flush lever. The inlet 28 to the lower housing body 24 may connect the lower housing body 24 to a fluid source and provide fluid communication therebetween. The inlet 28 may be secured to a fluid source via a nut 36 that circumferentially extends around an inlet extension 40, an O-ring 46, and a locking ring 48. The inlet extension 40 may be cylindrical in shape and defines a hollow inner chamber 42 for the passage of water. The lower housing body 24 receives the inlet extension 40, which extends perpendicularly outward from the lower housing body 24. The connection of the inlet extension 40 and the lower housing body 24 connects the inner chamber 42 of the inlet extension to a lower chamber 44 within the lower housing body 24.

A diaphragm assembly 52 is disposed within the upper housing body 22 and the lower housing body 24 between the inlet 28 and the outlet 32 and includes a diaphragm 56 and a disc 60. The diaphragm assembly 52 has a diaphragm assembly opening 64 and a bypass opening 68. As illustrated, the diaphragm assembly opening 64 is centrally located on the diaphragm assembly 52 and the bypass opening 68 may be peripherally located on the diaphragm assembly 52; however, they may be otherwise geometrically disposed. The diaphragm 56 and the disc 60 extend circumferentially outward, each defining an outer diameter. The outer diameter of the diaphragm 56 is larger than the outer diameter of the disc 60. The disc 60 is received in a central opening in the diaphragm 56 that aligns with the opening 64 in the diaphragm assembly 52. The diaphragm 56 receives a base 72 of the disc 60 in the central opening in the diaphragm 56 while an outward protrusion 76 of the disc 60 is disposed above a portion of a top surface of the diaphragm 56. The base 72 of the disc 60 is threadably connected to a diaphragm assembly extension 80. The diaphragm assembly extension 80 is positioned below the diaphragm 56 and the disc 60 and is cylindrical. The diaphragm assembly extension 80 defines a peripheral chamber 82 between an outer wall of the diaphragm assembly extension 80 and an inner wall of a valve seat 84 that extends upward in the housing as a cylindrical column. When the flush valve 20 is in the closed position as is illustrated in FIG. 1, the diaphragm assembly 52 is positioned on a top lip of the valve seat 84 which places the diaphragm assembly 52 in a sealing position between the inlet 28 and the outlet 32. An upper chamber 88 is positioned above the diaphragm assembly 52 and is in fluid communication with the lower chamber 44 via the bypass opening 68 of the diaphragm 56.

Above and downwardly extending into the upper chamber 88, there is a relief valve assembly 92. The relief valve assembly 92 is positioned within and supported by a fixed member 96 that is secured between the upper housing body 22 and lower housing body 24, and an inner surface of the fixed member 96 may also provide a top wall of the upper chamber 88 that provides a fluid boundary that prevents fluid from communicating outside of the fixed member 96. The fixed member 96 may include an extension 98 that extends vertically from a radial position of the fixed member 96. The relief valve assembly 92 includes a motor 100 connected to a power source 102 positioned outside of the fixed member 96. In a non-limiting example, the power source 102 may be one or more batteries.

The motor 100 has a shaft that extends out of the motor 100 and connects to a gear train 104 (which may also be referred to as a drive train) which ultimately toggles whether the relief valve 92 is opened or closed. The gear train 104 shown features simple gears and compound gears. One skilled in the art would appreciate the gear train 104 shown is not limiting and could be modified in a variety of applications. The gear train 104 connects to a driven shaft 106 that extends away from the gear train 104. The driven shaft 106 has a driven shaft extension 108 that extends perpendicularly outward from the driven shaft 106 that selectively contacts a rotational stop 110 that may be hemicylindrical in shape to surround a portion of the driven shaft 106. The rotational stop 110 can be supported by the fixed member extension 98. A female driving member 112 receives an axially-translatable valve element 114 that has a male lead screw part 116 positioned to be received in the female driving member or part 112 and a seal body 118 on a bottom portion of the axially-translatable valve element 114 that selectively contacts a top surface of a stationary relief valve housing 120. Although the male lead screw part 116 is described in detail, alternative embodiments, which may feature a male worm gear part, are possible. The stationary relief valve housing 120 extends away from the axially-translatable valve element 114 through the chamber 88 and into the diaphragm assembly opening 64. The stationary relief valve housing 120 features an upper body 124 that is received in the fixed member 96 (by threads in the illustrated embodiment) and a lower body 128 that is received in the diaphragm assembly opening 64. The stationary relief valve housing 120 features a relief valve chamber or relief passageway 132 that extends through the upper body 124 and the lower body 128. The relief valve chamber 132 opens to an outlet chamber 136 that is positioned below the relief valve assembly 92 in the lower housing body 24.

As best seen in FIG. 2, an inlet opening 152 in the housing receives the inlet extension 40. The inlet opening 152 fixes the inlet extension 40 to the lower housing body 24 and provides fluid communication between the inner chamber 42 of the inlet extension 40 and the lower chamber 44 of the lower housing body 24. The lower chamber 44 of the housing circumferentially surrounds the valve seat 84.

An outer diaphragm groove 156 may allow the diaphragm 56 to be secured between the upper housing body 22 and the lower housing body 24. The outer diaphragm groove 156 may be within an outer diaphragm profile 160 which provides an increased thickness around the outer circumference of the diaphragm 56. The outer diaphragm groove 156 may be in the top surface and bottom surface of the outer diaphragm profile 160. In some embodiments, the outer diaphragm groove 156 on the bottom surface of the diaphragm profile 160 is secured by the lower housing body 24 and the outer diaphragm groove 156 on the top surface of the diaphragm profile 160 may be secured by the fixed member 96 as best depicted in FIG. 1.

A bottom surface of outward protrusion 76 of the disc 60 may be fixed to a top surface of the diaphragm 56. The outward protrusion 76 of the disc 60 has a raised inner area 164 that has a thickness greater than the thickness of the outward protrusion 76. The disc 60 surrounds the lower body 128 of the stationary relief valve housing 120 that is centrally positioned through the diaphragm assembly 52 and is sealingly engaged therewith with an O-ring 236 forming a seal between the diaphragm assembly opening 64 and the lower body 128 of the stationary relief valve housing 120.

Referring now to FIG. 3, the upper housing body 22 has a sensor opening 188 that may be any appropriate shape. As shown in a non-limiting example, the sensor opening 188 may be rectangular with rounded edges oriented vertically on the upper housing body 22. The sensor opening 188 may be any appropriate shape to receive a sensor 196 that is positioned within the upper housing body 22 or to permit the sensor 196 to sense therethrough. The sensor 196 may have an outward protrusion 200 that may be configured to fit within the sensor opening 188 for purposes of assembly or construction. In the form illustrated, the upper housing body 22 is configured to contain the diaphragm assembly 52, the relief valve assembly 92, and the sensor 196.

The power source 102 (see FIG. 1) is received within the upper housing body 22. As best depicted in FIG. 3, the power source 102 may include a battery housing 204, one or more batteries 208, and a battery housing cover 212. The battery housing 204 may have a curved structure that is configured to fit within an inner wall of the upper housing body 22. The battery housing 204 may be configured to contain one or more batteries 208 within one or more battery chambers 206 within the battery housing 204. In some embodiments, the batteries 208 may be arranged vertically within the battery housing 204. The battery housing cover 212 may be configured to close the battery housing 204 with a shape that may match the curved structure of the battery housing 204. A bottom surface of the battery housing cover 212 may contact a top surface of the battery housing 204 and may be secured thereon.

The relief valve assembly 92 (see FIG. 2) may be received within the upper housing body 22. The motor 100 may be positioned above the gear train 104 and the rotational stop 110. The gear train 104 may be secured to the extension 98 of the fixed member 96 via fasteners fixed to a top surface of the extension 98 of the fixed member 96. A plate 216 is positioned above the stationary relief valve housing 120 and receives the female driving member 112 in an interior opening of the plate 216. The plate 216 is secured to plate extensions 220 that extend from the top fixed member 96. The plate extensions 220 may be cylindrical in shape and provide clearance for the female driving member 112 over a top surface of an upper body 228 of the fixed member 96. The relief valve assembly 92 is received in an opening 222 in the top of the fixed member 96.

The upper body 228 of the fixed member 96 may extend vertically from a lower body 232 of the fixed member 96. The upper body 228 of the fixed member 96 may be cylindrical having a hollow inner chamber configured to receive at least the stationary relief valve housing 120. The lower body 232 of the fixed member 96 may extend radially outward from a bottom surface of the upper body 228 of the fixed member 96.

The female driving member 112 may be positioned around the axially-translatable valve element 114 that is positioned above the stationary relief valve housing 120. O-ring 236 is received at the bottom of the stationary relief valve housing 120 and forms a sliding seal between the diaphragm assembly opening 64 and the lower body 128 of the stationary relief valve housing 120. A top surface of the stationary relief valve housing 120 may have an extension 238 that includes a relief valve inlet 240. In some embodiments, the extension 238 is conical in shape and is configured to be received in the seal body 118 of the axially-translatable valve element 114. In other embodiments, the extension 238 may be cylindrical, semi-spherical, or any other appropriate shape than can be sealed by the seal body 118.

With additional reference back to FIGS. 1 and 2 in combination with FIG. 3, the relief valve assembly 92 is positioned above the diaphragm assembly 52 at least partially within the upper housing body 22. The diaphragm assembly extension 80 extends below the diaphragm 56 and features a diaphragm assembly upper support 244 and one or more diaphragm assembly guides 248. A bottom surface of the diaphragm assembly upper support 244 is fixed to a top surface of one or more diaphragm assembly guides 248. The diaphragm assembly upper support 244 is cylindrical in shape and wraps around the diaphragm assembly extension 80 while leaving a gap 246 around an outer surface of the diaphragm assembly extension 80. The one or more diaphragm assembly guides 248 are rectangular and are positioned vertically on the outer surface of the diaphragm assembly extension 80. The one or more diaphragm assembly guides 248 are spaced radially around the perimeter of the diaphragm assembly extension 80. The one or more diaphragm assembly guides 248 may be placed at 90 degree intervals around an outer surface of the diaphragm assembly extension 80. The diaphragm assembly 52 contacts a top surface of the valve seat 84 and the diaphragm assembly extension 80 extends into the lower housing body 24.

Figure 4:
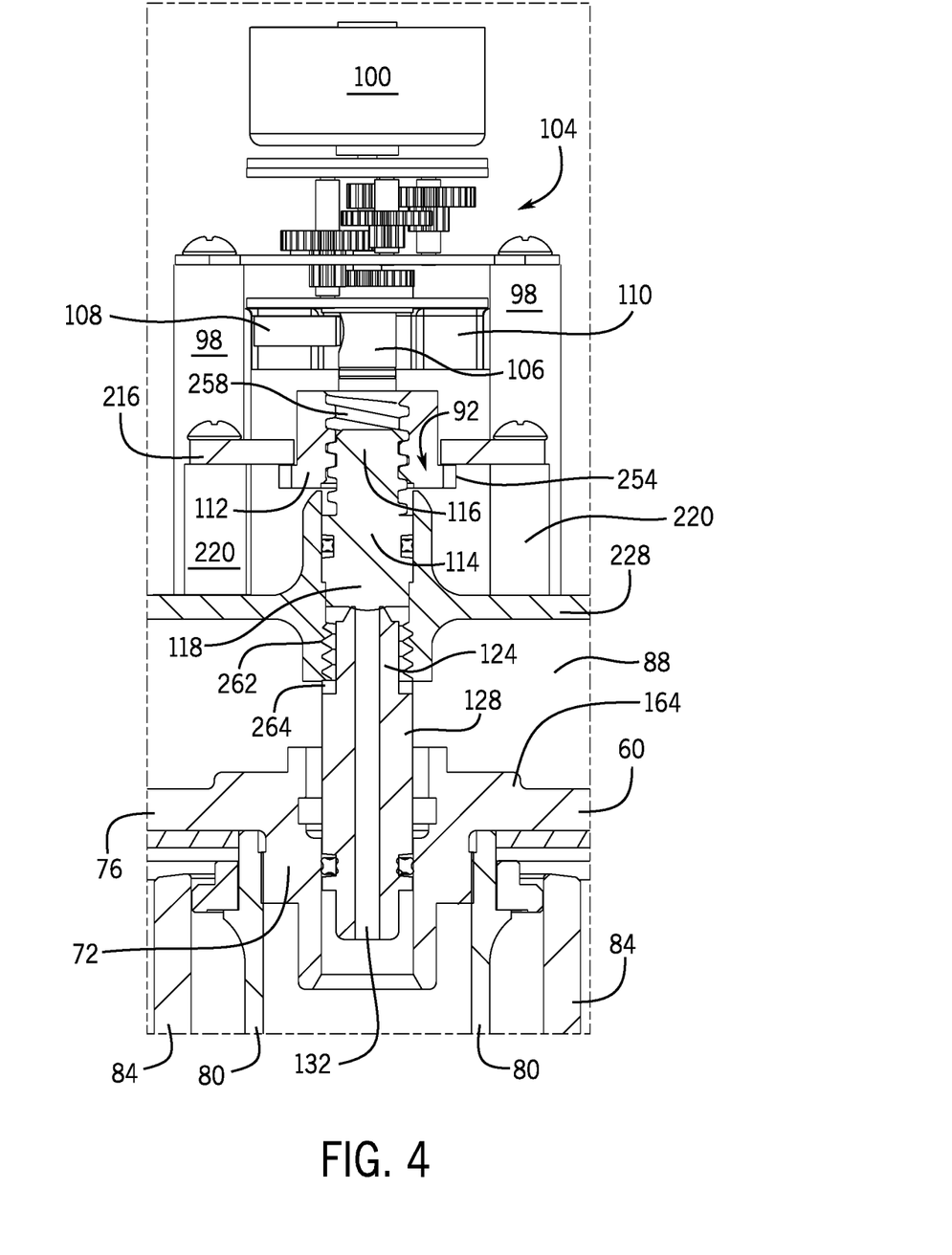
FIG. 4 is a detailed sectional view of the relief valve.
Figures 5, 6:
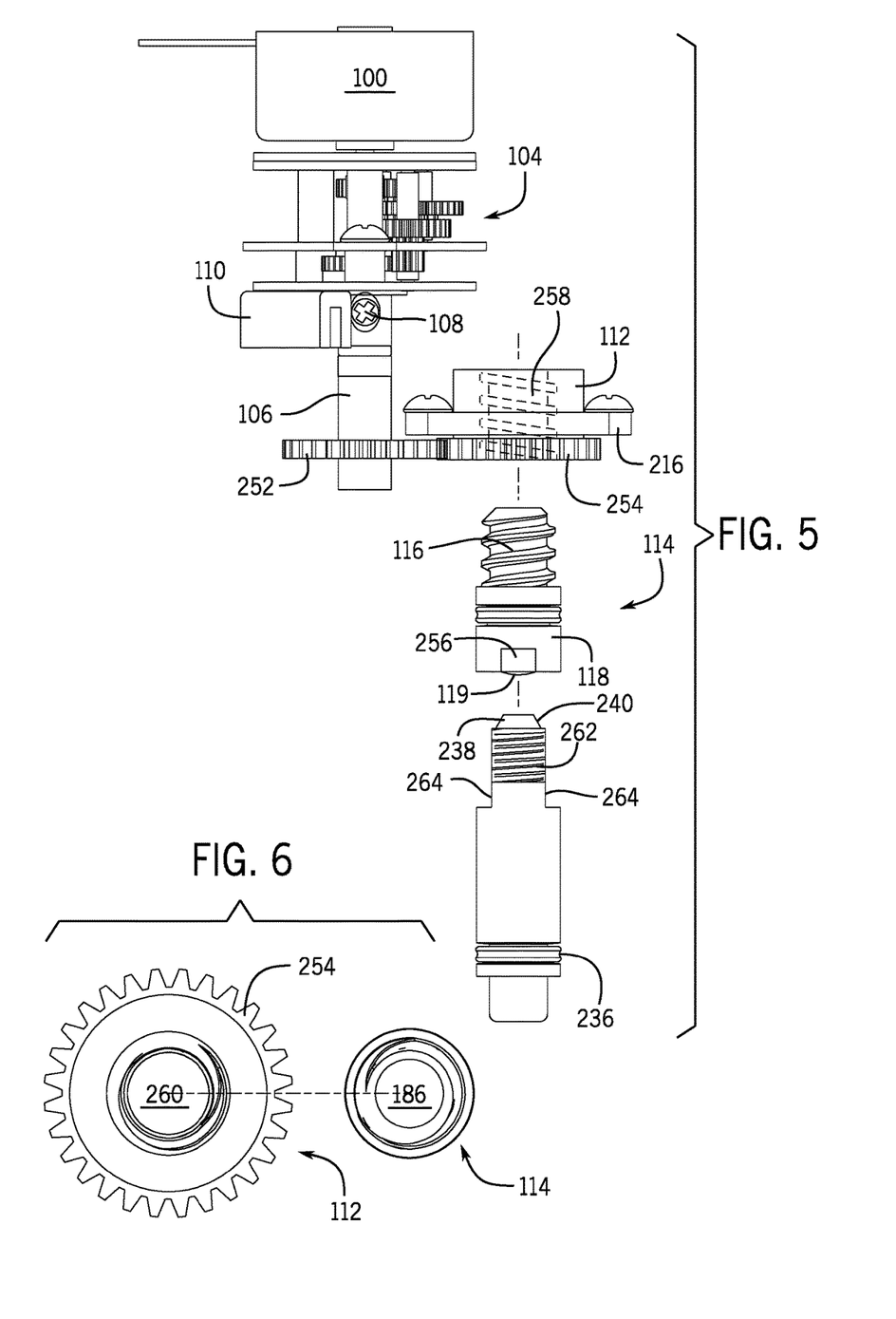
FIG. 5 is an exploded side view of the relief valve and the drive train in isolation from the rest of the flush valve.
FIG. 6 is a side-by-side top view of a male lead screw part and a female driving part.

Referring now to FIGS. 4-6, the relief valve assembly 92 may be assembled with the gear train 104 positioned below the motor 100 and above the rotational stop 110. The driven shaft extension 108 is cylindrical in shape and extends perpendicularly outward from the driven shaft 106 to selectively contact a face of the rotational stop 110, depending on the rotational position of the driven shaft 106 with respect to the rotational stop 110. The driven shaft 106 has a gear 252 positioned near a bottom end of the driven shaft 106 that drives a gear 254 on the exterior surface of the female driving member 112. The female driving member 112 is generally cylindrical in shape and has interior threads 258 positioned around the interior of an opening 260 in the female driving member 112. The opening 260 and the interior threads 258 selectively receive the male lead screw body 116 of the axially-translatable valve element 114.

The seal body 118 of the axially-translatable valve element 114 is positioned near a bottom end of the axially-translatable valve element 114. The axially-translatable valve element 114 may also feature one or more flat surfaces 256 on the exterior face of the axially-translatable valve element 114 near the bottom surface of the axially-translatable valve element 114. In some embodiments, the seal body 118 may feature sealing surface 119 that selectively seals the relief valve assembly 92 by contacting the extension 238 on the top surface of the stationary relief valve housing 120 and the relief valve inlet or opening 240 (see FIG. 3), in particular. In some embodiments, the sealing surface 119 may be made of an elastomeric material. The relief valve inlet 240 is connected to the relief valve chamber or passageway 132 that extends through the interior of the stationary relief valve housing 120. The stationary relief valve housing 120 has threads 262 around an outer surface near the top of the stationary relief valve housing 120 that are received by the fixed member 96 in order to secure the stationary relief valve housing 120. One or more flat surfaces 264 (or other removed sections) may be positioned near the top end of the stationary relief valve housing 120 in the axial region of the threading 262. As shown, the relief valve assembly 92 is offset from the motor 100. In other embodiments, the relief valve assembly 92 can be coaxial with the motor 100.

Now that the components of the flush valve 20 have been described in detail, their respective functionalities may be appreciated and described more fully. Referring to FIGS. 4-8, the motor 100 may be configured to generate rotational motion that is translated through the gear train 104 to the driven shaft 106 and the gear 252. The rotational motion of the driven shaft 106 causes rotational motion of the gear 252 which meshes with the gear 254 connected to the female driving member 112 and consequently causes rotational motion of the female driving member 112. The interior threads 258 rotate with the female driving member 112 and selectively engage the male lead screw body 116 of the axially-translatable valve element 114 thereby selectively turning the rotational motion from the motor 100 into axial translation of the axially-translatable valve element 114.

Rotation of the female driving member 112 with respect to the axially-translatable valve element 114 may change the position of the axially-translatable valve element 114 due to the connection between the male lead screw body 116 and the interior threads 258 of the female driving member 112. The flat surfaces 256 of the axially-translatable valve element 114 engage an inner surface of the fixed member 96 in order to prevent rotational movement of the axially-translatable valve element 114. However, engagement between the flat surfaces 256 and the fixed member 96 still allow the axially-translatable valve element 114 to translate vertically due to the rotation of the female driving member 112 and the engagement between the interior threads 258 and the male lead screw body 116.

Figure 7:
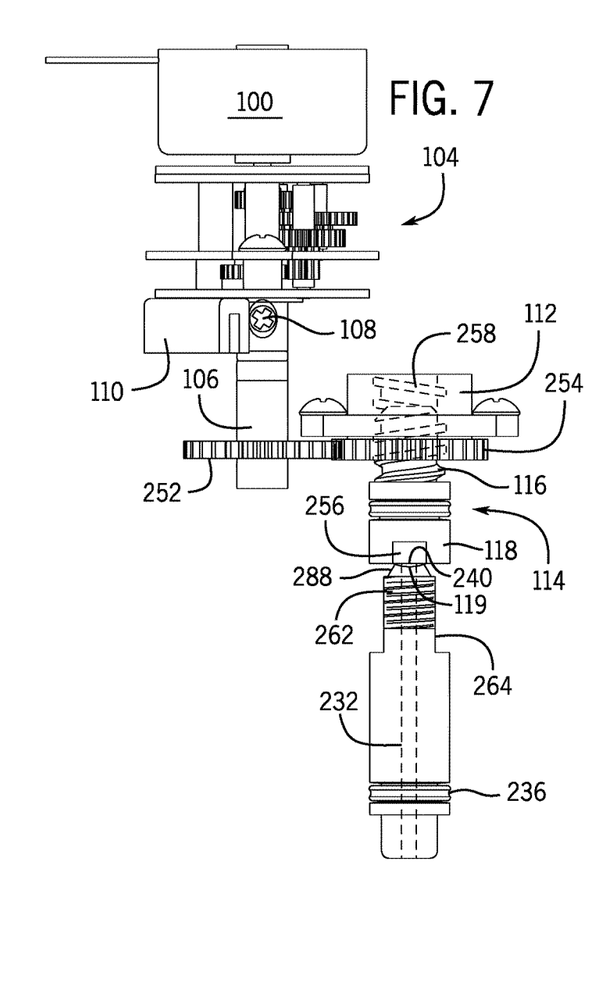
FIG. 7 is a side view of the relief valve assembly and drive train in a closed position in isolation from the remainder of the flush valve.
Figure 8:
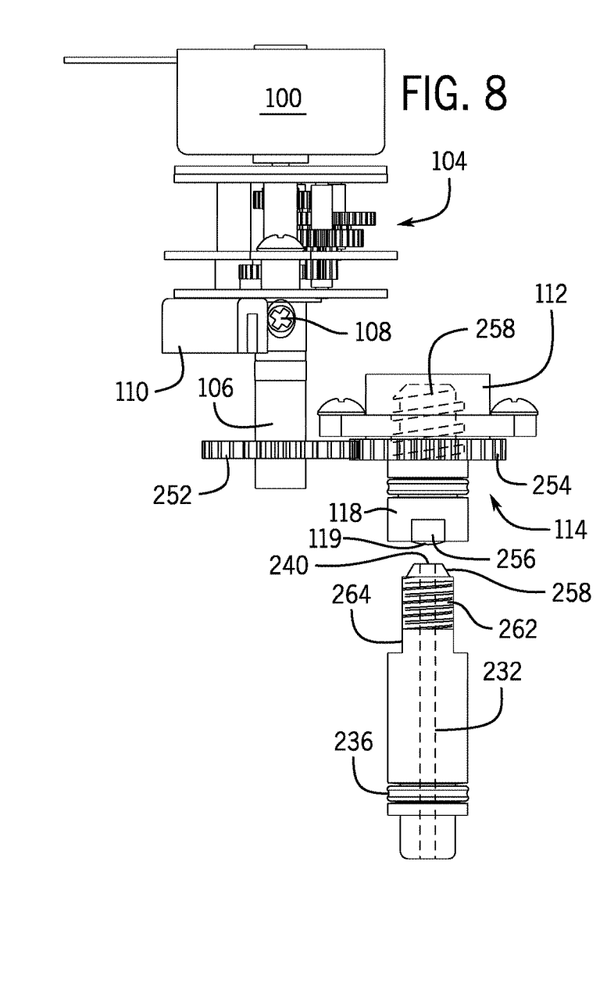
FIG. 8 is a side view of the relief valve assembly in an open position in isolation from the remainder of the flush valve.

Selective movement of the axially-translatable valve element 114 defines a plurality of positions of the relief valve assembly 92. A first position of the relief valve assembly 92 shown in FIG. 7 is a closed position defined by the seal body 118 of the axially-translatable valve element 114 being in sealed contact with the extension 238 and relief valve inlet or opening 240 (see FIG. 8) of the stationary relief valve housing 120. In the closed position, fluid communication is prohibited to pass through the relief valve assembly 92. A second position of the relief valve assembly 92 shown in FIG. 8 which is an open position defined by the seal body 118 of the axially-translatable valve element 114 being axially translated away from the relief valve inlet 240 positioned near a top end of the stationary relief valve housing 120. Translation of the seal body 118 of the axially-translatable valve element 114 away from the extension 238 and relief valve inlet 240 of the stationary relief valve housing 120 allows fluid communication through the relief valve assembly 92 via the relief valve inlet 240 and the relief valve chamber 132.

Figures 9, 10, 11:
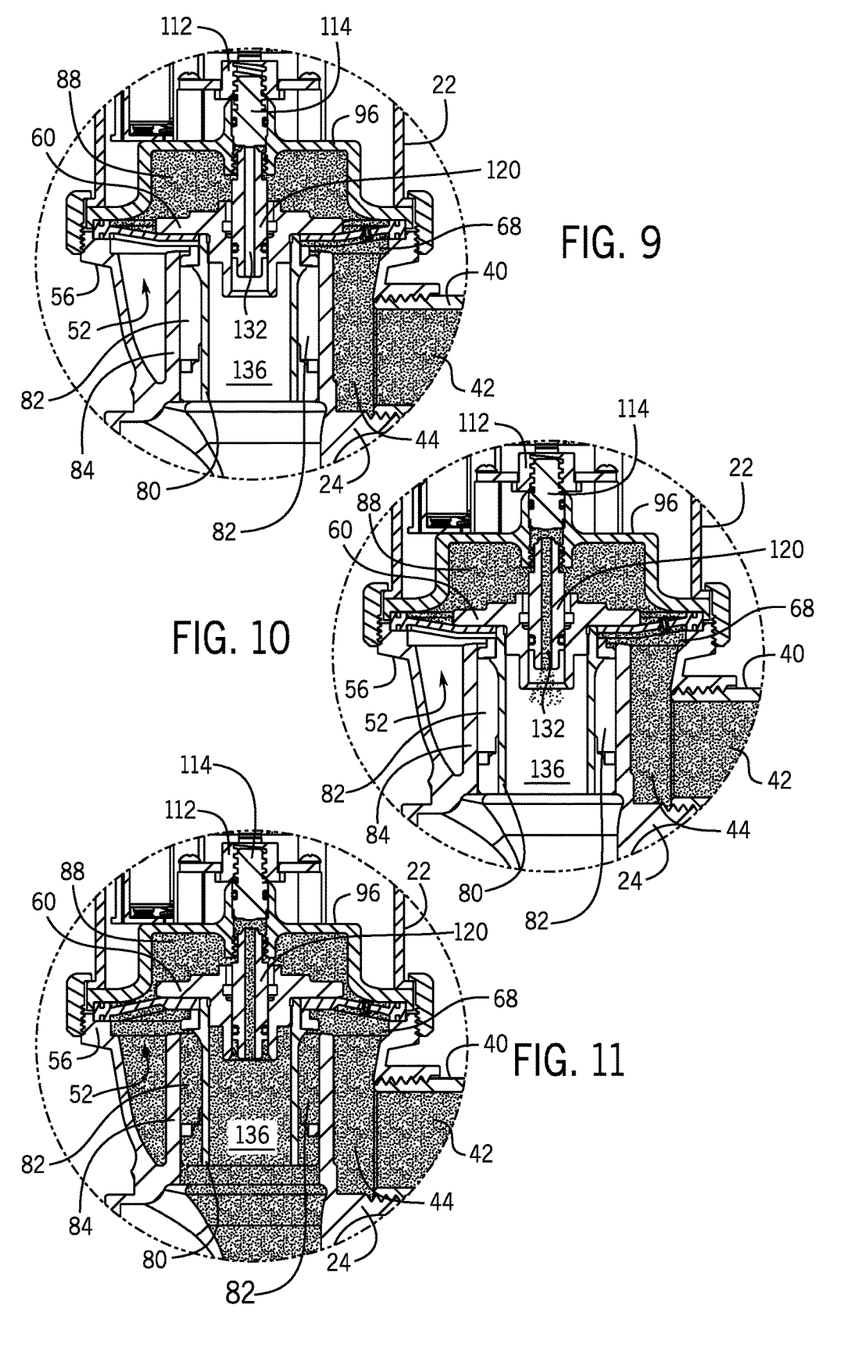
FIG. 9 is a detailed sectional view of an area A-A of the flush valve in the closed position.
FIG. 10 is a detailed sectional view of an area A-A of the flush valve just after the relief valve enters the open position, but prior to the flush valve lifting.
FIG. 11 is a detailed sectional view of an area A-A of the flush valve in the open position.

Now with reference to FIGS. 9-11, the initiation of a flush cycle by temporarily actuating the relief valve assembly 92 from the closed position to the opened position is sequentially illustrated. This brief opening of the relief valve assembly 92 will cause the entire diaphragm assembly 52 to lift, permitting water to travel from the inlet 28 to the outlet 32.

FIG. 9 shows a detailed area A-A of the flush valve 20 in a closed position with fluid retained in the flush valve 20 and is unable to enter the outlet chamber 136 because the diaphragm assembly 52 remains sealed against the upper lip of the valve seat 84. Fluid provided through the inlet 28 (not shown in FIG. 9, but found in prior figures) into the inner chamber 42 which is in fluid communication with the lower chamber 44. The lower chamber 44 surrounds an outside of wall the valve seat 84 and is in fluid communication with the chamber 88 via the bypass opening 68 in the diaphragm 56. The bypass opening 68 places the lower chamber 44 in fluid communication with the upper chamber 88. The relief valve inlet 240 is in selective fluid communication with the relief valve chamber 132. The flat surfaces 264 of the stationary relief valve housing 120 produce a gap between the flat surfaces 264 and the fixed member 96. The gap between the one or more flat surfaces 264 and the fixed member 96 provide fluid communication between the upper chamber 88 and the relief valve assembly 92 via the relief valve inlet 240. In the position illustrated in FIG. 9, the relief valve assembly 92 is in the closed position defined by the seal body 118 of the axially-translatable valve element 114 being in sealed contact with the extension 238 and relief valve inlet 240 of the stationary relief valve housing 120. In the closed position, fluid communication is prohibited to pass through the relief valve assembly 92.

As mentioned above, the diaphragm assembly 52 is in a closed position while the relief valve assembly 92 remains in the closed position. The closed position of the diaphragm assembly 52 is defined by the diaphragm assembly 52 being received against the valve seat 84 creating a seal therebetween. The diaphragm assembly 52 may be held in a closed position by the force of fluid in the chamber 88, exerting a downward force on the diaphragm 56 and the disc 60, thereby pressing the diaphragm assembly 52 against the valve seat 84.

FIG. 10 shows the area A-A of the flush valve 20 just after the relief valve assembly 92 has been opened to initiate the opening of the flush valve 20, but before water was passed entirely through the relief valve assembly 92 to permit the diaphragm assembly 52 to lift. The open position of the flush valve is achieved when the motor 100 translates the seal body 118 of the axially-translatable valve element 114 away from the extension 238 and relief valve inlet 240 positioned near a top end of the stationary relief valve housing 120. Translation of the seal body 118 of the axially-translatable valve element 114 away from the extension 238 and relief valve inlet 240 of the stationary relief valve housing 120 allows fluid communication through the relief valve assembly 92 via the relief valve inlet 240 and the relief valve chamber 132. This creates fluid communication through the relief valve assembly 92 such that water may pass from the upper chamber 88 into the outlet chamber 136. Just after the relief valve assembly 92 has been opened, the diaphragm assembly 52 may briefly remain in the closed position. The diaphragm assembly 52 may remain in the closed position just after the relief valve assembly 92 opens because the pressure exerted on the diaphragm assembly 52 temporarily holds it on the valve seat 84 as the pressure has not been relieved through the outlet chamber 136.

FIG. 11 shows the area A-A of the flush valve 20 where the relief valve assembly 92 has remained opened and the diaphragm assembly 52 has lifted such that the flush valve 20 is now in the open position. The open position of the flush valve 20 is achieved when the fluid from the upper chamber 88 is allowed to flow through the relief valve chamber 132 and into the outlet chamber 136 for a sufficient duration of time to break the seal at the valve seat 84. Fluid flow through the relief valve chamber 132 into the outlet chamber 136 relieves pressure in chamber 88 exerted on the diaphragm assembly 52. Under this change in pressure, the diaphragm 56 is flexible upward which causes vertical translation of the diaphragm assembly 52 away from the valve seat 84 to break the seal. Vertical translation of the diaphragm assembly 52 away from the valve seat 84 provides direct fluid communication between the lower chamber 44 and the outlet chamber 136 via the peripheral chamber 82. Put another way, with the diaphragm assembly 52 unseated from the valve seat 84, the inlet 28 and the outlet 32 are placed in direct fluid communication with one another past the upper opening in the valve seat 84.

To close the flush valve 20, the motor 100 translates the seal body 118 of the axially-translatable valve element 114 into the closed position where the seal body 118 is in sealed contact with the extension 238 and relief valve inlet 240 of the stationary relief valve housing 120. In the closed position, fluid communication is prohibited to pass through the relief valve assembly 92. After returning to the closed position, the pressure will rise in upper chamber 88 as fluid communication between upper chamber 88, the relief valve chamber 132, and the outlet chamber 136 are shut off while the bypass opening 68 provides fluid communication from the lower chamber 44 to the upper chamber 88. The increased pressure in upper chamber 88 flexes the diaphragm assembly 52 back down into a closed position by pressing the diaphragm assembly 52 against the valve seat 84, as shown in FIG. 7. The closed position of the diaphragm assembly 52 again, at least temporarily, prevents fluid communication between the lower chamber 44, the peripheral chamber 82, and the outlet chamber 136.

The flush valve 20 may be selectively in the open position for a pre-defined or selected period of time and that period of time may define a flush cycle. The period of time may be an appropriate amount of time to generate fluid flow through the flush valve 20 given the fixture on which the valve is received such as a urinal or toilet. A non-limiting example of a period of time range the relief valve assembly 92 may be in an open position for may be 0.5 to 3 seconds which may result in the flush valve to be open from 3 to 10 seconds. The time the relief valve assembly 92 is selectively in an open position may not be the time required to complete a flush, as the flush valve 20 may be in a closed position while residual fluid may flush.

A flush cycle may be initiated manually or automatically. An automatic flush cycle may occur when the sensor 196 detects a user has approached the flush valve 20 and will actuate the cycle when the identified user has left the flush valve 20. The sensor may communicate control instructions to the motor 100 to selectively rotate the relief valve assembly 92 into the open position in order to initiate a flush cycle. Alternatively, a flush cycle may be initiated manually using a manual actuation assembly (not shown).

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A flush valve comprising:
a valve housing defining a fluid passageway between a fluid inlet and a fluid outlet, the fluid passageway having a diaphragm valve seat disposed between the fluid inlet and the fluid outlet;
a diaphragm assembly including a diaphragm and a disc, the diaphragm having a primary opening and a bypass opening, the primary opening receiving the disc therein and the bypass opening allowing water under pressure supplied to the fluid inlet to pass from a fluid inlet side of the diaphragm into a chamber in the fluid passageway established by a presence of the diaphragm assembly in the fluid passageway, wherein the diaphragm assembly is disposed in the fluid passageway and is movable between an opened position in which the disc of the diaphragm assembly is not in contact with the diaphragm valve seat and a closed position in which the disc of the diaphragm assembly is in contact with the diaphragm valve seat; and
a relief valve configured to control fluid flow from the chamber to the fluid outlet, the relief valve comprising a stationary relief valve housing and an axially-translatable valve element, the stationary relief valve housing having a relief passageway and the axially-translatable valve element having an axial end positionable to seal an upper opening in the relief passageway of the stationary relief valve housing to regulate fluid flow;
wherein, in the closed position of the diaphragm assembly and with the relief valve closed, the disc contacts the diaphragm valve seat to form a seal and wherein, when the flush valve is activated and the relief valve is opened by lifting the axial end of the axially-translatable valve element from the upper opening of the relief passageway, a flow of water from the chamber into the fluid outlet via the relief passageway occurs thereby relieving a fluid pressure in the chamber and causing the diaphragm assembly to move from the closed position to the opened position such that the disc is unseated from the diaphragm valve seat further permitting water to pass from the fluid inlet to the fluid outlet in a space between the disc and the diaphragm valve seat;
wherein the chamber in the fluid passageway is established by a presence of the diaphragm assembly in the fluid passageway and a fixed member disposed within the valve housing, the fixed member contacts the diaphragm in at least one radial position and has an extension that extends away from the diaphragm assembly, the extension of the fixed member has an inner chamber;
wherein the inner chamber of the fixed member is configured to support at least the stationary relief valve housing of the relief valve assembly; and
wherein the stationary relief valve housing is threadably connected to the fixed member and wherein threads of the stationary relief valve housing have at least one planar flat surface formed therein to create fluid communication between a volume of an upper chamber between the fixed member and the diaphragm assembly and a volume between the stationary relief valve housing and the axial-translatable valve element.

2. The flush valve of claim 1, further comprising a motor wherein an axial position of the axially-translatable valve element relative to the stationary relief valve housing is configured to be controlled by the motor and a drive train that includes a lead screw part that is integral with the axially-translatable valve element.

3. The flush valve of claim 2, wherein the lead screw part that is integral with the axially-translatable valve element is a male lead screw part, wherein the drive train further comprises a female driving part positioned to drive the male lead screw part, and wherein the axially-translatable valve element is restricted from angular rotation such that driving of the male lead screw part by the female driving part displaces the axially-translatable valve element axially, but not angularly.

4. The flush valve of claim 3, wherein the female driving part is rotationally driven and meshes with the male lead screw part to provide axial translation of the axially-translatable valve element.

5. The flush valve of claim 1, wherein, when the diaphragm assembly is in the open position and the relief valve is returned to the closed position, fluid pressure builds in the chamber thereby causing the disc to contact the diaphragm valve seat thereby reforming a seal therebetween, returning the diaphragm assembly to the closed position.

6. The flush valve of claim 1, wherein the diaphragm valve seat defines a peripheral fluid passageway wherein the peripheral fluid passageway is in fluid communication with the fluid inlet and the fluid outlet when the diaphragm assembly is in the open position thereby allowing additional fluid to flow from the fluid inlet to the fluid outlet.

7. The flush valve of claim 1, wherein the open position of the relief valve occurs when the axial end of the axially-translatable valve element is translated out of contact with the stationary relief valve housing.

8. The flush valve of claim 1, wherein the diaphragm is flexible.

9. The flush valve of claim 1, wherein the diaphragm is configured to bend to allow the diaphragm assembly to move from the closed position to the open position.

10. The flush valve of claim 1, wherein the disc has a circular outer periphery.

11. The flush valve of claim 1, wherein the relief valve assembly is configured to be in an open position from 0.5 to 3 seconds which results in the flush valve being open from 3 to 10 seconds.

12. The flush valve of claim 1, wherein the axial end of the axially-translatable valve element has an elastomeric element on a tip thereof that seals the opening of the relief passageway of the stationary relief valve housing when the relief valve is in the closed position.

* * * * *